United States Patent
Corcoran

(10) Patent No.: US 8,052,397 B2
(45) Date of Patent: Nov. 8, 2011

(54) POLYGON ROTOR ATTACHMENT DEVICE

(75) Inventor: Mark Thomas Corcoran, Dracut, MA (US)

(73) Assignee: Lawrence Pumps Inc., Lawrence, MA (US)

( * ) Notice: Subject to any disclaimer, the term of this patent is extended or adjusted under 35 U.S.C. 154(b) by 691 days.

(21) Appl. No.: 12/233,636

(22) Filed: Sep. 19, 2008

(65) Prior Publication Data

US 2009/0081044 A1   Mar. 26, 2009

Related U.S. Application Data

(60) Provisional application No. 60/973,855, filed on Sep. 20, 2007.

(51) Int. Cl.
*F01D 5/02* (2006.01)

(52) U.S. Cl. .................................. 416/244 A; 464/182
(58) Field of Classification Search ............... 415/216.1; 464/182; 416/244 R, 244 A, 245 R, 245 A
See application file for complete search history.

(56) References Cited

U.S. PATENT DOCUMENTS

| 4,767,277 | A * | 8/1988 | Buse ........................ 416/241 A |
| 5,482,437 | A   | 1/1996 | Houston et al. |
| 7,527,479 | B2 * | 5/2009 | Shi et al. .................. 416/241 R |
| 2002/0006332 | A1 | 1/2002 | Haugen et al. |
| 2002/0155009 | A1 | 10/2002 | Panos et al. |
| 2002/0164252 | A1 * | 11/2002 | Haugen et al. ............ 416/244 A |
| 2005/0036893 | A1 | 2/2005 | Decker |

OTHER PUBLICATIONS

PCT Search Report dated Nov. 13, 2008 of Patent Application No. PCT/US08/76916 filed Sep. 19, 2008.

* cited by examiner

*Primary Examiner* — Benjamin Sandvik
*Assistant Examiner* — Krista Soderholm
(74) *Attorney, Agent, or Firm* — Vern Maine & Associates

(57) ABSTRACT

A rotor and shaft assembly for turbomachinery has a polygon shaped drive collar interposed between corresponding polygonal mating surfaces of a drive shaft and a rotor hub. The mating surfaces of the polygon collar, the drive shaft and the rotor hub may be sized both axially and radially for required torque transmission without the need for hub inserts or oversized shafts. The polygon drive collar is manufacturable using standard machine tools such as lathes and end mills that remove metal in a tool path following not more than two axes of simultaneous movement. A shaft end assembly secures the rotor and drive collar to the shaft.

20 Claims, 2 Drawing Sheets

POLYGON ROTOR ATTACHMENT DEVICE

RELATED APPLICATIONS

This application claims priority for all purposes to pending U.S. application Ser. No. 60/973,855, filed Sep. 20, 2007.

FIELD OF INVENTION

This invention generally relates to a polygon attachment for coupling different rotating members for transmitting torque. In particular, the invention relates to a coupling for connecting a rotor to a pinion or drive shaft.

BACKGROUND OF INVENTION

Numerous attachment devices are generally known for operatively connecting turbomachinery rotor elements, such as rotors, to drive shafts. Keys, tapered polygon couplings, splines, and conical tapers are all rotor element attachment devices.

Threaded couplings can transmit high torque loads, and are easy to manufacture, but have an inherent disadvantage of being unidirectional. If torsional load is applied counter to the direction of thread pitch, the rotor will decouple from the shaft with resultant damage to the machine, and costly production losses. Numerous decoupling prevention devices have been applied to threaded couplings to overcome this problem, but they all increase manufacturing costs, and most do not have true bi-directional torque transmission capability in that torque carrying capability under reverse rotation conditions is less than under normal forward rotation conditions.

Turbo-machines often operate under a wide variety of torque loads. Due to component weight considerations, or process conditions, it is often desirable that turbomachinery incorporate rotors of especially soft or especially brittle materials. The ability to transmit torque through these materials without deformation due to stress loads often requires that an additional part, manufactured from alternate material, be fixedly inserted into the rotor hub for the purpose of transmitting torque levels from keyed, conically tapered, or splined connections, which would not otherwise be feasible. An alternative is to decrease the stress loads by increasing the mating surface areas through the use of a shaft of increased diameter. Both of these options are undesirable in that they increase both weight and cost of the machine.

Polygon tapers provide an alternative coupling method relative to keys, conical tapers, or splines in that they are capable of carrying high torque loads, through very soft or very brittle materials, without the need for costly hub inserts. They are superior to threaded connections in that they have true bi-directional torque carrying capability. A disadvantage of polygon tapers, such as shown in U.S. Pat. No. 5,482,437, which is incorporated by reference herein, is that they require special tooling to be manufactured, such as machines capable of grinding internal bores to tapered polygon shapes, that are unavailable in most repair facilities, resulting in the delays and expenses related to transporting parts to specialty manufacturing facilities for repair.

Therefore there is a need for an improved means for operatively connecting turbomachinery rotor elements, such as impellers, to drive shafts that would: be capable of bi-directional transmission of high torque loads between the drive shafts and the turbo-machinery rotors; be capable of transmitting high torque loads between the drive shafts and turbomachinery rotors manufactured from soft or brittle materials; and be manufacturable or repairable using equipment and manufacturing practices available to most machine shops.

SUMMARY OF THE INVENTION

The present invention in one aspect overcomes the shortcomings of the prior art of rotary machines through the use of a non-tapered polygon drive collar fixedly and coaxially mounted and radially interposed between corresponding non-tapered polygonal mating surfaces of a drive shaft and a rotor. The mating surfaces of the straight polygon collar, the drive shaft and the rotor may be sized both axially and radially according to the load and material requirements, so as to allow for torque transmission without the need for hub inserts or oversized shafts. The straight polygon drive collar is manufacturable using standard machine tools such as lathes and end mills that remove metal in a tool path following not more than two axes of simultaneous movement.

It is an object of this invention that the drive arrangement be capable of bi-direction transmission of equal magnitudes of torque.

It is an object of this invention that polygon drive collar may be sized both axially and radially according to the materials and characteristics of the structural components and the properties of the fluid materials to which the rotor is being exposed, so as to allow for torque transmission without the need for hub inserts or oversized shafts.

It is an object of this invention that it be manufacturable using standard machine tools such as lathes and end mills that remove metal in a tool path following not more than two axes of simultaneous movement.

Various objects of the invention are met by another aspect of the invention that relates to a rotor and shaft assembly for turbomachinery consisting first of a shaft with an inboard and an outboard shaft end, between which are configured two axial sections; a non-tapered, uniform diameter rotor hub section to support a rotor hub and a non-tapered, polygon shaped drive collar section to support a mating, polygon shaped drive collar. The two axial sections can be configured in either order, so long as the diameter of the section further outboard is smaller than the inboard section. There is also a shaft stop which may be in the form of a shoulder and may be configured inboard of both sections or between the two sections in some cases as further described herein. The outboard shaft end is configured for receiving a shaft end assembly for securing a mating rotor hub and drive collar on the shaft, against the shaft stop.

There is further provided in this regard a rotor hub comprising a hub bore of uniform diameter and a radially centered, non-tapered, polygon shaped drive collar recess configured in one face of the rotor hub, which consumes a portion of the axial length of the hub. There is yet further provided the aforementioned drive collar, configured with a polygon shaped, non-tapered outer edge and a coaxial, polygon shaped, non-tapered central opening. The drive collar is as thick or thicker than the recess is deep. The polygon shaped outside edge is sized for axially sliding, non-rotational engagement with the polygon shaped drive collar recess of the rotor hub, and the polygon shaped central opening is sized for axially sliding, non-rotational engagement with the polygon drive collar section of the drive shaft.

The assembled rotor and shaft in this aspect consists of the polygon drive collar being axially and non-rotationally engaged in the polygon recess of the rotor hub. The rotor hub and drive collar are axially and non-rotationally fitted onto the respective rotor hub and drive collar sections of the shaft, and are thereafter secured thereon between the shaft stop and the shaft end by the threaded shaft end assembly.

Other aspects, goals and objectives of the invention will be readily apparent to those of ordinary skill in the art from the drawings, description and claims that follow.

DETAILED DESCRIPTION OF THE INVENTION

The invention is applicable to turbomachinery of various types, for various applications; including but not limited to radial flow, axial flow, and mixed flow types used for the handling of gas, liquids, and solids either singularly or in combination. The invention is capable of numerous embodiments. What is described and shown here is illustrative but not limiting of the scope of the invention.

Figure 1:
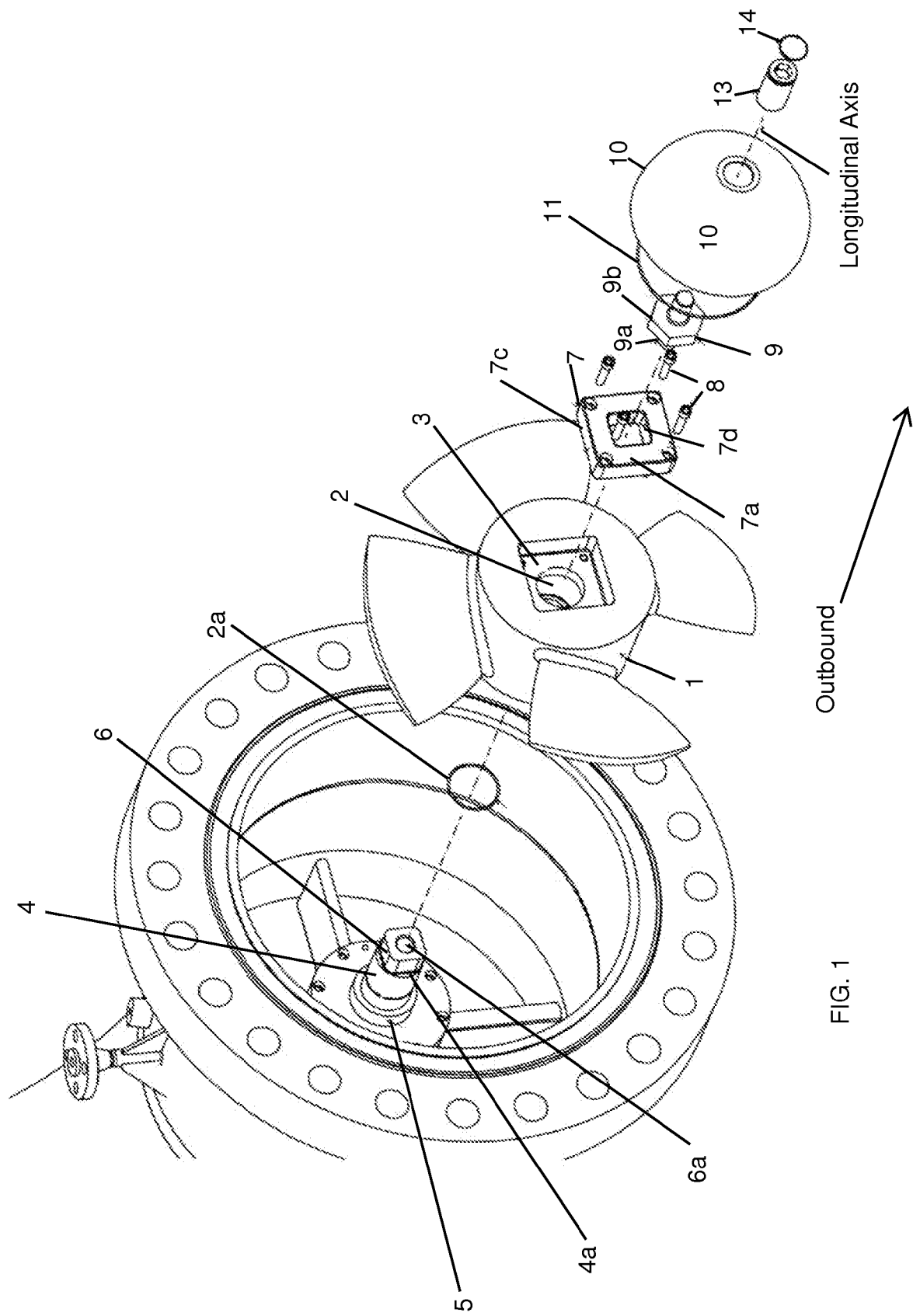
FIG. 1 is an exploded isometric view of an axial turbomachine design that incorporates one embodiment of the present invention where the shaft end is adapted to accept an externally threaded member for retaining a rotor.

Referring to FIG. 1, the rotor hub (1) incorporates a circular bore (2) extending along its longitudinal axis. Bore (2) is straight, meaning not tapered, although it may be stepped at the discretion of the designer for ease of assembly and removal. Bore (2) may also have an annulus or other means (not shown) to accept a static seal (2a). A non-tapered polygon recess (3) is machined into or otherwise configured in the outboard face of rotor hub (1) coaxially with the axis of bore (2). Polygon recess (3) is here shown as a four sided polygon, but polygons of three or more sides are within the scope of the invention. Polygon recess (3) is illustrated as a regular polygon, but irregular polygons are within the scope of the invention.

Rotor hub (1) is mounted coaxially with rotor mating section (4) of drive shaft (5) which is machined to have a close sliding fit with the hub bore (2). Clearance between hub bore (2) and rotor mating section (4) of drive shaft (5) is sealed by static seal (2a). Shaft section (6) at the outboard end of drive shaft (5) is machined such that it has a polygon shape when viewed along its longitudinal axis from the outboard end. Polygon shaft section (6) extends axially along shaft (5) such that its inboard end terminates at a shoulder shaft stop (4a) at which begins the rotor mating section (4) of shaft (5). Polygon shaft section (6) is non-tapered along its longitudinal axis.

Polygon drive collar (7) has outboard and inboard faces (7a)&(7b—not shown) respectively, that extend radially outward to form a polygon shaped drive collar outer edge (7c) when viewed along any radial section, and radially inward terminating at a polygon shaped drive collar opening (7d), that is coaxial with, but not necessarily of similar shape to outer edge (7c). Drive collar outer edge (7c) is sized for axially sliding, non-rotational fitment within recess (3) of rotor hub (1). Drive collar opening (7d) is sized for axially sliding, non-rotational fitment on polygon shaft section (6). Regular polygons of 4 sides are depicted in FIG. 1 for polygon recess (3), polygon shaft section (6) drive collar outer edge (7c) and drive collar opening (7d). Polygons of either the regular or irregular type with 3 or more sides are within the scope of the invention. All surfaces along the longitudinal axis of polygon drive collar (7) are non-tapered. When assembled with rotor hub (1), polygon shaft section (6) and polygon drive collar (7) are coaxial with the longitudinal shaft axis. Drive collar outer edge (7c) forms a close sliding fit with non tapered rotor hub polygon recess (3) and drive collar opening (7d) forms a close sliding fit with polygon shaft section (6). Drive collar inboard face (7b—not shown) mates with the bottom or face of polygon recess (3) and drive collar outboard face (7a) terminates just outboard of the outboard end of polygon shaft section (6).

Polygon shaft section (6) is here shown as a four sided polygon, but polygons of three or more sides are within the scope of the invention. Polygon shaft section (6) is illustrated as a regular polygon, but irregular polygons are within the scope of the invention. Polygon shaft section (6) may comprise a more easily configured variant of a four sided irregular polygon having two parallel opposing long sides carrying the torque load and two opposing but relatively shorter sides, where the two opposing shorter sides may have a curved surface of uniform radius with reference to the shaft axis. Drive collar opening (7d) in this case may have conforming curved opposing shorter sides or conventional straight sides. The polygon shape of drive collar outer edge (7c) may be oriented to have its maximum diameter aligned with the longer dimension of the polygon of shaft section (6). The intersecting sides of any or all interior and exterior mating polygon shapes employed in the invention may be configured with a slight radius of suitable dimension.

Referring again to FIG. 1, polygon drive collar (7) is in this embodiment fixedly joined with rotor hub (1) with fasteners (8). Many other methods of attachment such as interference fits, welding, threaded covers, to name a few, may be used in place of fasteners (8) without detracting from the invention described herein. Polygon shaft section (6) is drilled and tapped with hole (6a), at its outboard face, extending some distance inward along the longitudinal axis of drive shaft (5). In other embodiments, there may be no direct means of attachment of the collar to the hub, but rather the collar and the hub may be rotationally aligned, axially mated, and together secured to shaft (5) against an inboard shaft stop by a common means, such as for example, by a shaft end nut, bolt, or other analogous shaft end fastener.

Locknut (9) in this embodiment has an externally threaded hub (9a) along its longitudinal axis and a coaxial flanged radial section (9b) of a diameter greater than the maximum diameter of polygon shaft section (6). Hub (9a) threadably engages shaft end hole (6a) until flange (9b) mates flush with face (7a) of polygon drive collar (7). Alternatively, the outboard end of drive shaft (5) may be configured with external threads and hub (9a) may be drilled and tapped with internal threads without detracting from the scope of the invention. Fairing cap (10) has one machined face (10a) that is sealably mounted against the outboard face of rotor hub (1) with static seal (11) forming a leak-tight joint between fairing cap (10) and rotor hub (1). Fairing cap (10) has a hole drilled on its longitudinal axis through which fairing cap attachment nut (13) passes to threadably engage externally threaded hub (9b) along the longitudinal axis of locknut (9).

Static seal (14), mounted in an annular slot on the outside diameter of fairing cap attachment nut (13) seals the annulus between fairing cap attachment nut (13) and fairing cap (10). Fairing cap (10) is depicted in FIG. 1 as having a hemispherical shape, but could be other shapes as the particular application warrants, as long as a suitable surface is maintained for mating with rotor hub (1). Fairing cap (10), fairing cap attachment bolt (13), and static seals (2a), (11a), and (14) are used on an application specific basis and can be eliminated without detracting from the nature or scope of the invention.

Figure 2:
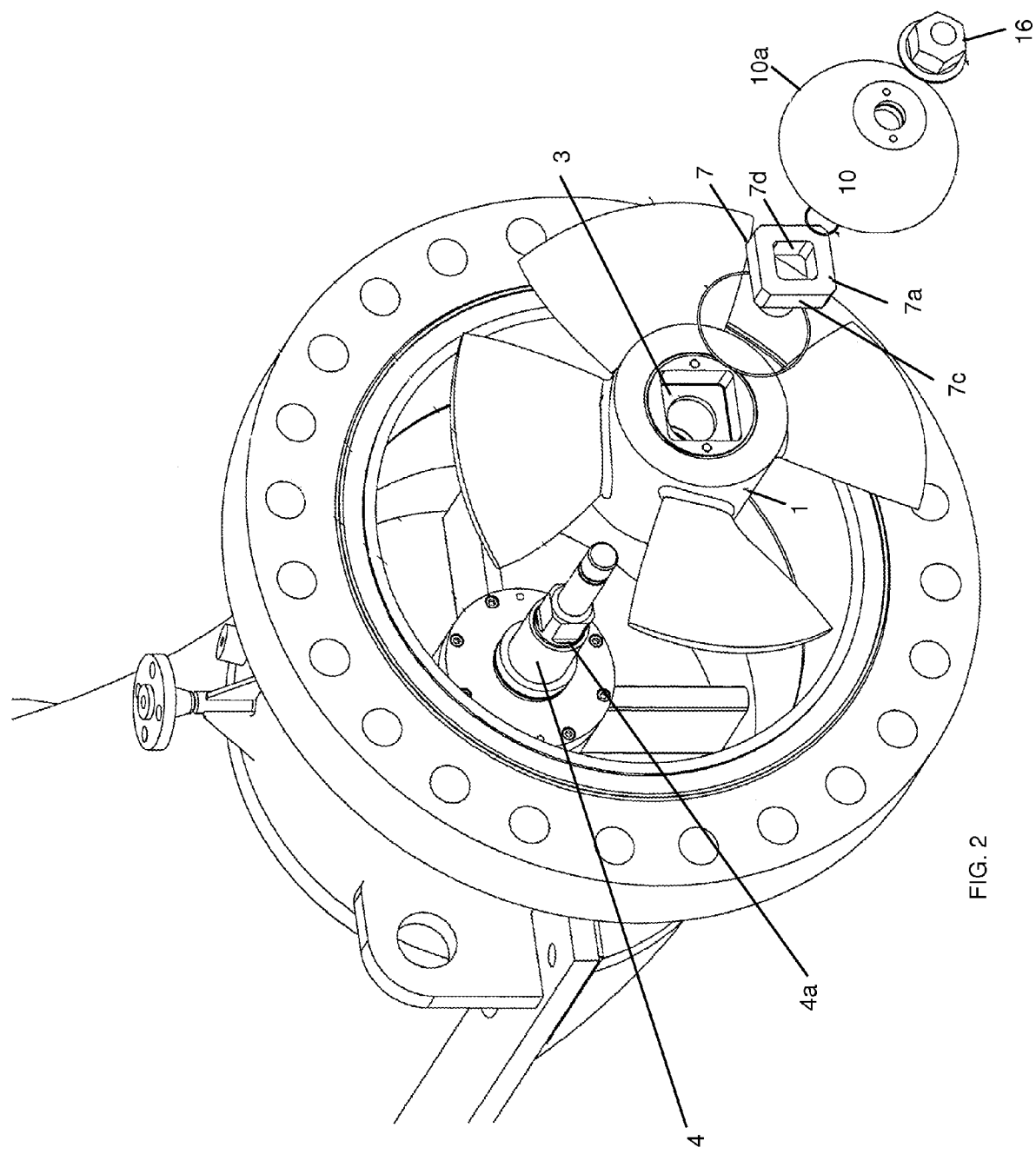
FIG. 2 is an exploded isometric view of an axial turbomachine design of an alternate embodiment where the shaft end is adapted to accept an internally threaded member for retaining a rotor.

Referring now to FIG. 2, an alternate embodiment is shown whereby the axial length of polygon drive collar (7) is substantially equal to the axial depth of polygon recess (3) such that the outboard face (7a) of polygon drive collar (7) is substantially coplanar with the outboard face of the rotor hub (1) when the two components are mated.

In this embodiment polygon drive collar (7) is fixedly attached to hub (1) by an interference fit, welding or some other positive means, negating the need for fasteners (8); although fasteners (8) could be used providing that they were recessed into countersunk holes machined in to the outboard face (7a), or otherwise configured such that the substantially coplanar nature of the assembly of polygon drive collar (7) and the outboard face of hub (1) was not disrupted by protruding fasteners.

An axial extension of shaft (4) passes through the assembly hub (1), polygon drive collar (7) and fairing cap (10). Locknut (16) threadably engages mating threads on at distal end of shaft (4) such that fairing cap (10), such that the inboard face (10a) of fairing cap (10) is positively mated to the assembly of polygon drive collar (7), hub (1) and shaft (4).

As will be readily understood by those of ordinary skill in the art from this disclosure, the invention is susceptible of stacking the illustrated and described rotor hubs and drive collars of FIGS. 1 and 2 as a rotor hub assembly on a common polygon-shaped shaft so as to provide embodiments such as, for example, but not limited to: a single rotor hub having both inboard and outboard drive collars; two abutting rotor hubs driven by or driving a common polygon-shaped drive collar extending into and between rotationally aligned, same size, abutting polygon-shaped drive collar recesses so as to rotationally lock the abutting rotor hubs together and to the shaft; either or both of the two abutting rotor hubs in the prior example having an additional, opposite end polygon-shaped drive collar as well; and further multiples and variations along these lines.

Other and various embodiments, examples, and equivalents of the description, figures, and claims that follow are within the scope of the invention. For example, referring loosely to the figures and prior description, there is within the scope of the invention a rotor and shaft assembly that includes a shaft; a shaft stop, pin, clip, locknut or shoulder or any common form of structure that is intended to resist inboard axial motion or migration of shaft mounted components. There is a non-tapered, uniform diameter rotor hub section and a non-tapered, polygon shaped, drive collar section on the shaft. The outboard end of the shaft is configured for rotationally receiving a threaded shaft end assembly for securing a rotor hub or hub assembly on the shaft against the shaft stop.

There is a rotor hub or hub assembly that includes a hub with a rotor vane or vanes extending therefrom, a hub bore of uniform diameter, and a radially centered, non-tapered, polygon shaped drive collar recess configured in at least one face or axial end of the rotor hub, where the polygon is larger than the diameter of the bore. There is a drive collar with generally co-planar inboard and outboard faces, although either face in various embodiments may be other than flat. The drive collar has a polygon shaped, non-tapered outer edge or perimeter and a smaller, coaxial, polygon shaped, non-tapered, central opening. The rotor hub and drive collar may be of the same or different materials and material characteristics for many reasons. Examples include but are not limited to; the drive collar make of harder material than the hub for transmitting torque at higher force from the smaller radius shaft to the lower force at the larger radius outer edge of the drive collar to the rotor hub, or the drive collar may be more flexible than the rotor hub for absorbing shock so as to inhibit the transfer of spikes of torque or force between the rotor and the shaft.

The polygon shaped outside edge of the drive collar is sized for axially sliding, non-rotational assembly or engagement with the polygon shaped drive collar recess of the rotor hub, and the polygon shaped central opening is sized for axially sliding, non-rotational assembly or engagement with the polygon drive collar section of the drive shaft. When assembled, the polygon drive collar is axially and non-rotationally engaged in the polygon recess of the rotor hub, the rotor hub and drive collar are axially and non-rotationally fitted onto the respective rotor hub and drive collar sections of the shaft and are secured there by the shaft stop and the threaded shaft end assembly. Different embodiments when assembled may have the hub recess and drive collar on the inboard or the outboard side of the rotor hub. In some embodiments, the rotor assembly may be assembled with either orientation, depending on the desired direction of rotation and flow or in some cases to swap the trailing edge for the leading edge of the rotor blades or vanes. The hub may have a recess in both ends, permitting assembly with the drive collar always outboard, or always inboard, or drive collars on both ends, and the rotor oriented in either axial direction.

The polygon shaped shaft section may be outboard and of smaller diameter than the hub bore section. The intersection of the polygon shaft section and the hub bore section may form the shaft stop, as in FIGS. 1 and 2, or the shaft stop may be inboard of both sections. The drive collar recess may be on either or both the outboard face or the inboard face of the rotor hub. There may be means for securing the drive collar within the drive collar recess. The resulting hub and drive collar assembly may be secured in alternative embodiments by gripping only the drive collar as in FIGS. 1 and 2, or both components as described elsewhere, between the shaft stop and shaft end assembly.

The shaft end may have internal or external screw threads, the threaded shaft end assembly having a suitable mating configuration. The shaft end may have an axial bore with internal threads, where the shaft end assembly has a hub with external threads. The rotor and shaft assembly may incorporate a seal between the rotor hub and shaft. It may incorporate a seal between the threaded shaft end assembly and the rotor hub.

The polygon shaped shaft section and the center opening of the drive collar may have a common polygon shape of four sides. Irrespective of the shaft and drive collar center opening shape, the polygon shaped drive collar recess in the rotor hub and the drive collar outer edge may share a common polygon shape of four sides.

The shaft end assembly may have a fairing cap with a flat backside that mates with the outboard face of the rotor hub. In other or the same embodiments, the shaft end assembly may have a locknut with a flanged section of a diameter greater than the maximum diameter of the polygon shaft section.

Another example of the invention consists of a rotor and shaft assembly that includes a shaft having a shaft stop, a non-tapered, polygon shaped drive collar section, and an outboard shaft end configured for receiving shaft end assembly for securing a rotor hub assembly of at least one rotor hub on the shaft. There is at least one rotor hub that has an axially oriented hub bore and at least one coaxial, non-tapered, polygon shaped, drive collar recess in one or both ends of the rotor hub. The recess in some embodiments may extend all the way through the hub, and thereby subsume the bore. There is at least one drive collar of the general characteristics previously described, that is engagable with the rotor hub and the shaft in the manner described. Extending on this, the at least one rotor hub may be multiple rotor hubs. One or more rotor hubs may have drive collar recesses configured in one or both the inboard and the outboard faces of the hub. There may be multiple drive collars. There may be in one embodiment an inboard and outboard drive collar for each of two or more abutting rotor hubs. Abutting hubs may share a common drive collar of sufficient length to bridge and rotationally lock adjoining drive collar recesses.

Other and numerous embodiments and equivalents within the scope of the appended claims will be readily apparent to one of ordinary skill from this teaching.

I claim:

1. A rotor and shaft assembly for turbomachinery comprising:
   a shaft, said shaft comprising: a shaft stop; a non-tapered, uniform diameter rotor hub section; a non-tapered, polygon shaped drive collar section; and an outboard shaft end configured for rotationally receiving a threaded shaft end assembly for securing a rotor hub on the shaft;
   a rotor hub comprising a hub bore of uniform diameter and a radially centered, non-tapered, polygon shaped drive collar recess configured in one face of the rotor hub; and
   a drive collar with a polygon shaped, non-tapered outer edge and a coaxial, polygon shaped, non-tapered central opening; the polygon shaped outside edge sized for axially sliding, non-rotational engagement with the polygon shaped drive collar recess of the rotor hub, the polygon shaped central opening sized for axially sliding, non-rotational engagement with the polygon drive collar section of the drive shaft; the polygon drive collar being axially and non-rotationally engaged in the polygon recess of the rotor hub, the rotor hub and drive collar being axially and non-rotationally fitted onto the respective rotor hub and drive collar sections of the shaft and being secured thereto by the shaft stop and the threaded shaft end assembly.

2. The rotor and shaft assembly of claim 1, said polygon shaped shaft section being outboard and of smaller diameter than said hub bore section, the intersection of the polygon shaft section and the hub bore section forming said shaft stop, said drive collar recess being on the outboard face of said rotor hub.

3. The rotor and shaft assembly of claim 1, further comprising means for securing said drive collar within said drive collar recess.

4. The rotor and shaft assembly of claim 1, said shaft end comprising external threads, said threaded shaft end assembly comprising internal threads.

5. The rotor and shaft assembly of claim 1, said shaft end comprising an axial bore with internal threads, said threaded shaft end assembly comprising a hub with external threads.

6. The rotor and shaft assembly of claim 1, further comprising a rotor hub to shaft seal.

7. The rotor and shaft assembly of claim 1, further comprising a threaded shaft end assembly to rotor hub seal.

8. The rotor and shaft assembly of claim 1, said polygon shaped shaft section comprising a polygon shape of four sides.

9. The rotor and shaft assembly of claim 1, said polygon shaped drive collar recess comprising a polygon shape of four sides.

10. The rotor and shaft assembly of claim 1, said threaded shaft end assembly further comprising a fairing cap with a flat backside that mates against the outboard face of the rotor hub.

11. The rotor and shaft assembly of claim 2, said threaded shaft end assembly comprising a locknut with a flanged section of a diameter greater than the maximum diameter of the polygon shaft section.

12. A rotor and shaft assembly for turbomachinery comprising:
    a shaft, said shaft comprising: a shaft stop; a non-tapered, uniform diameter rotor hub section; a non-tapered, polygon shaped drive collar section outboard and of smaller diameter than the rotor hub section; and an outboard shaft end configured for rotationally receiving a threaded shaft end assembly for securing a rotor hub on the shaft;
    a rotor hub comprising a hub bore of uniform diameter and a radially centered, non-tapered, polygon shaped drive collar recess configured in an outboard face of the rotor hub; and
    a drive collar with a polygon shaped, non-tapered outer edge and a coaxial, polygon shaped, non-tapered central opening; the polygon shaped outside edge sized for axially sliding, non-rotational engagement with the polygon shaped drive collar recess of the rotor hub, the polygon shaped central opening sized for axially sliding, non-rotational engagement with the polygon drive collar section of the drive shaft; the polygon drive collar being axially and non-rotationally secured in the polygon recess of the rotor hub, the rotor hub and drive collar being axially and non-rotationally fitted onto the respective rotor hub and drive collar sections of the shaft and being secured thereto between the shaft stop and the shaft end by the threaded shaft end assembly, said threaded shaft end assembly comprising a fairing cap.

13. The rotor and shaft assembly of claim 12, further comprising fasteners securing said drive collar to said rotor hub.

14. The rotor and shaft assembly of claim 12, further comprising a rotor hub to shaft seal and a threaded shaft end assembly to rotor hub seal.

15. The rotor and shaft assembly of claim 12, said polygon shaped shaft section comprising a regular polygon shape of four sides, said polygon shaped drive collar recess comprising a regular polygon shape of four sides.

16. A rotor and shaft assembly comprising:
    a shaft, said shaft comprising: a shaft stop; a non-tapered, polygon shaped drive collar section; and an outboard shaft end configured for receiving a shaft end assembly for securing at least one rotor hub on the shaft;
    at least one rotor hub comprising a hub bore extending axially through the rotor hub, and at least one coaxial, non-tapered, polygon shaped drive collar recess in a respective at least one end of the rotor hub; and
    at least one drive collar with a polygon shaped, non-tapered outer edge and a coaxial, polygon shaped, non-tapered central opening; the polygon shaped outside edge sized for axially sliding, non-rotational engagement with a said polygon shaped drive collar recess in a said rotor hub, the polygon shaped central opening of said drive collar sized for axially sliding, non-rotational engagement with the polygon drive collar section of the drive shaft; the at least one polygon drive collar being axially and non-rotationally engaged in a respective said polygon recess of a respective said rotor hub, the at least one rotor hub and the at least one drive collar being axially and non-rotationally fitted onto the shaft and being secured thereto between the shaft stop and the shaft end by said shaft end assembly.

17. The rotor and shaft assembly of claim 16, said at least one rotor hub comprising multiple rotor hubs.

18. The rotor and shaft assembly of claim 16, respective said drive collar recesses configured in both the inboard and the outboard faces of the rotor hub.

19. The rotor and shaft assembly of claim 16, said at least one drive collar comprising multiple drive collars.

20. The rotor and shaft assembly of claim 16, said rotor hub comprising an inboard and an outboard end drive collar recess, said at least one drive collar comprising an inboard drive collar and an outboard drive collar.

* * * * *